United States Patent
Crapart

(10) Patent No.: US 6,293,558 B1
(45) Date of Patent: Sep. 25, 2001

(54) GASKET FOR A ROTATING SHAFT AND A DEVICE INCORPORATING SUCH A GASKET

(75) Inventor: René Crapart, Segre (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/450,930

(22) Filed: Nov. 29, 1999

(30) Foreign Application Priority Data

Dec. 1, 1998 (FR) .................................................. 98 15128

(51) Int. Cl.$^7$ ....................................................... F16J 15/32
(52) U.S. Cl. ........................ 277/552; 217/551; 217/563; 217/572
(58) Field of Search ................................ 277/551, 552, 277/563, 572

(56) References Cited

U.S. PATENT DOCUMENTS

| | | | |
|---|---|---|---|
| 3,682,488 | * 8/1972 | Matsushima | 277/551 |
| 4,428,630 | * 1/1984 | Folger et al. | 277/551 |
| 4,433,846 | * 2/1984 | Romero et al. | 277/551 |
| 4,550,920 | 11/1985 | Matsushima | 277/134 |
| 5,421,591 | 6/1995 | Katzensteiner | 277/31 |
| 5,522,600 | * 6/1996 | Duckwall | 277/551 |

FOREIGN PATENT DOCUMENTS

| | | |
|---|---|---|
| 41 05 746 | 8/1991 | (DE) . |
| 0 189 723 | 8/1986 | (EP) . |
| 1 437 899 | 7/1966 | (FR) . |
| 2 408 081 | 6/1979 | (FR) . |
| 1 202 061 | 8/1970 | (GB) . |
| 2 106 196 | 4/1983 | (GB) . |

OTHER PUBLICATIONS

French Preliminary Search Report dated Jul. 27, 1999, Int'l. Appl. No. FR 9815128.

* cited by examiner

Primary Examiner—Anthony Knight
Assistant Examiner—Enoch E. Peavey
(74) Attorney, Agent, or Firm—Marshall, Gerstein & Borun

(57) ABSTRACT

A gasket is inserted between a housing filled with pressurized oil and a rotating shaft projects out from said housing. This gasket has two sealing lips which delimit between them a collecting chamber provided with a discharge passage for lubricant. A calibrated nozzle allows oil to be fed into the collecting chamber at a predetermined flow rate in order to lubricate the outer lip.

13 Claims, 3 Drawing Sheets

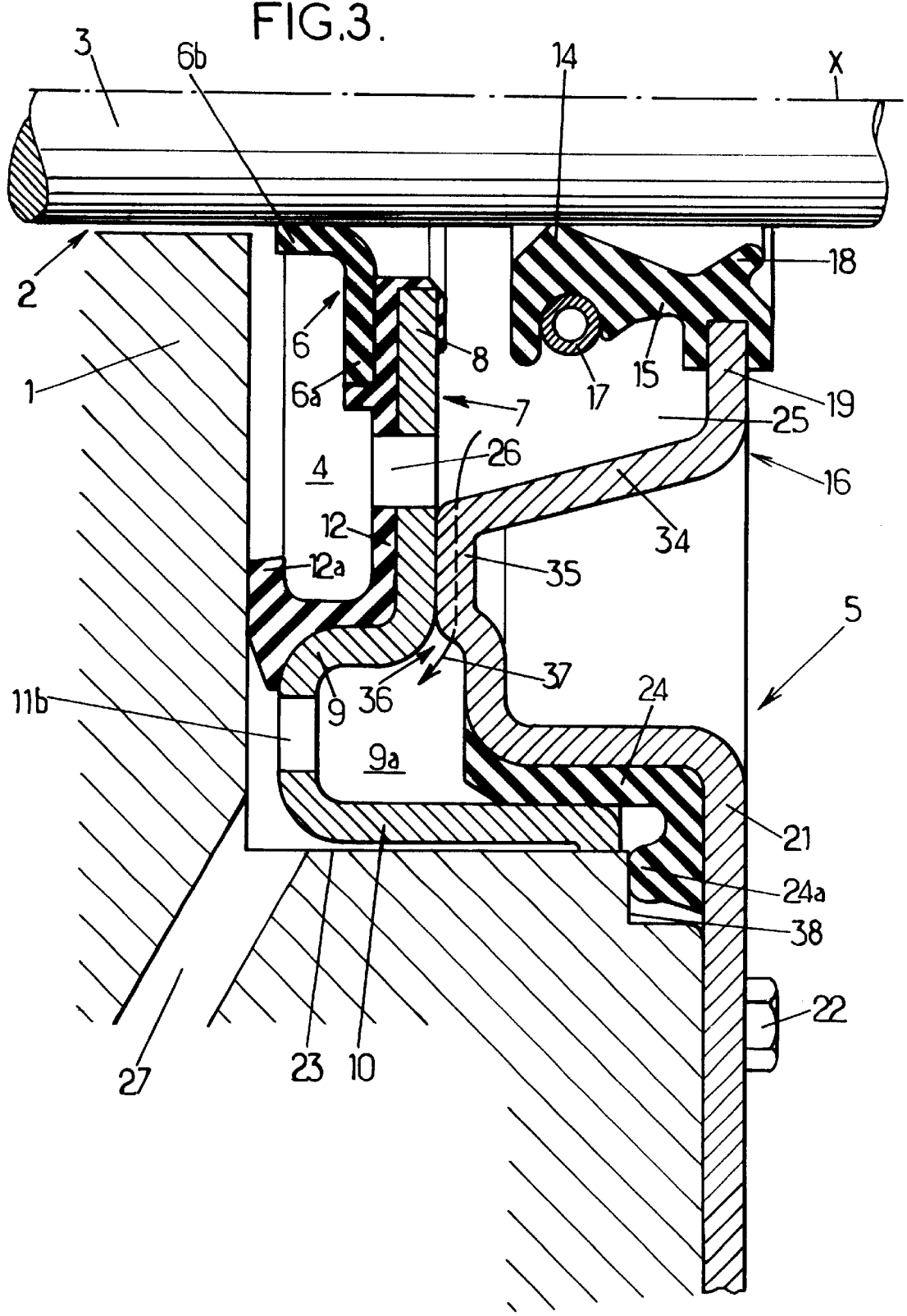

GASKET FOR A ROTATING SHAFT AND A DEVICE INCORPORATING SUCH A GASKET

FIELD OF THE INVENTION

The present invention relates to gaskets for rotating shafts and to the devices incorporating such gaskets.

More specifically, the invention relates to a gasket designed to be inserted between:

a housing with an interior volume filled with liquid lubricant and subjected to a certain level of pressure, and a shaft projecting out from said housing and rotating at a certain rotation speed about a longitudinal axis, this gasket comprising a first annular sealing lip which is designed to be joined to the housing and placed in sliding rotary contact with the shaft, the first sealing lip being designed to withstand a first lubricant threshold pressure below 1 bar and to permit shaft rotation speeds in excess of 5000 rpm (revolutions per minute).

BACKGROUND OF THE INVENTION

Document EP-A-0 189 723 describes an example of such a gasket which is perfectly adequate, provided the lubricant contained in the housing is at low pressure.

However, this gasket is no longer suitable when this lubricant is at a relatively high pressure, higher than 5 bar and generally 10 to 20 bar, for example, which will occur in particular if the gasket is fitted on a lubricated bearing subjected to pressure, in particular a bearing of an automatic gearbox for a motor vehicle.

The invention is intended more specifically to overcome this disadvantage.

To this end, the invention proposes a gasket of the type outlined above, in which:

it also has a second annular sealing lip which is also designed to be joined to the housing and to be in sliding contact with the shaft, the second sealing lip being designed to permit shaft rotation speeds in excess of 5000 rpm and to withstand a second threshold pressure, in excess of 5 bar, prevailing in the interior volume of the housing, this second sealing lip being designed so that it can be inserted between the interior volume of the housing and the first sealing lip, the second sealing lip delimits, in conjunction with the first sealing lip, a lubricant collecting chamber provided with a discharge passage for the lubricant, the gasket also has a calibrated nozzle bypassing the second sealing lip so as to provide direct communication between the interior volume of the housing and the collecting chamber, the calibrated nozzle, the second sealing lip and the lubricant discharge passage are so dimensioned that a lubricant pressure prevailing in the collecting chamber is at most equal to said first threshold pressure when the lubricant contained in the interior volume of the housing is at a pressure at most equal to the second threshold pressure.

As a result of these features, it is possible to provide a gasket that is suitable for fitting on shafts rotating at relatively high speeds operating with lubricants which are also at high pressures.

In preferred embodiments of the gasket proposed by the invention, one and/or the other of the following features may also be incorporated:

the second sealing lip is made from PTFE;

the first sealing lip is made from elastomer;

the gasket also has a third anti-dust sealing lip which is joined to the housing and which is in sliding rotary contact with the shaft, this third sealing lip being arranged opposite the collecting chamber relative to the first sealing lip in order to protect said first sealing lip;

the calibrated nozzle and the second sealing lip are so dimensioned that lubricant flows at a rate ranging between 7 and 100 l/h from the interior volume of the housing to the collecting chamber if a pressure ranging between 10 and 20 bar prevails in said interior volume;

the second threshold pressure is between 10 and 20 bar;

the first and second sealing lips are joined respectively to first and second rigid frames which are fixed one to the other in a clamped fit, at least one of these frames having at least one recess which forms the discharge passage for the lubricant.

The invention also relates to a device comprising:

a housing with an interior volume filled with liquid lubricant which is subjected to a certain level of pressure, a shaft projecting out from said housing and rotating at a certain rotation speed about a longitudinal axis, and a gasket as defined above, inserted between the shaft and the housing, the first and second sealing lips of the gasket being joined to the housing and in sliding rotary contact with the shaft, the second sealing lip being disposed axially between the interior volume of the housing and the first sealing lip and the calibrated nozzle providing direct communication between the interior volume of the housing and the collecting chamber.

In preferred embodiments of this device, one and/or the other of the following features may also be incorporated:

the second sealing lip has an L-shaped cross section, with a first arm joined to a rigid frame substantially perpendicular to the longitudinal axis of the shaft and having a second arm which extends towards the interior volume of the housing substantially parallel with the longitudinal axis of the shaft;

the first and second sealing lips being joined respectively to first and second rigid frames which are fixed one to the other in a clamp fit, the second frame having at least one recess which forms the lubricant discharge passage, the first and second frames each having a cylindrical wall covered with elastomer which co-operates to provide a fitting on the housing to close off respectively the interior volume of the housing and the collecting chamber, and the first frame also having an external extension which is joined directly to the housing;

the first and second sealing lips are joined respectively to first and second rigid frames which are fixed one to the other in a clamp fit, the second frame having at least one recess which forms the lubricant discharge passage, the first frame having a cylindrical wall covered with elastomer which co-operates to form a fitting on the housing to provide a sealed closure of the collecting chamber, this cylindrical wall being extended by a rigid, enlarged cylindrical collet which is in direct contact with the housing and which co-operates with said housing by means of a force-fit, the second frame being joined to an additional sealing lip which cooperates with the housing to seal off the interior volume of said housing;

the first and second sealing lips are joined respectively to first and second rigid frames, which are fixed one to the other by a clamp fit with a layer of elastomer seal inserted between them, the second frame having at least one recess which forms the lubricant discharge passage, the first frame being joined to a first additional elastomer sealing lip which co-operates with the housing to seal off the collecting chamber, the second frame being joined to a second additional sealing lip which co-operates with the housing to seal off the interior volume of said housing, the first frame being joined directly to the housing and being axially supported against the second frame at local points.

BRIEF DESCRIPTION OF THE DRAWINGS

Other features and advantages of the invention will become clear from the following description of three of its embodiments, given by way of illustration and not restrictive in any respect, with reference to the appended drawings.

Of the drawings:

FIGS. 2 and 3 are views similar to that of FIG. 1, showing second and third embodiments of the invention.

MORE DETAILED DESCRIPTION

The same references denote identical or similar elements in the different drawings.

Figure 1:
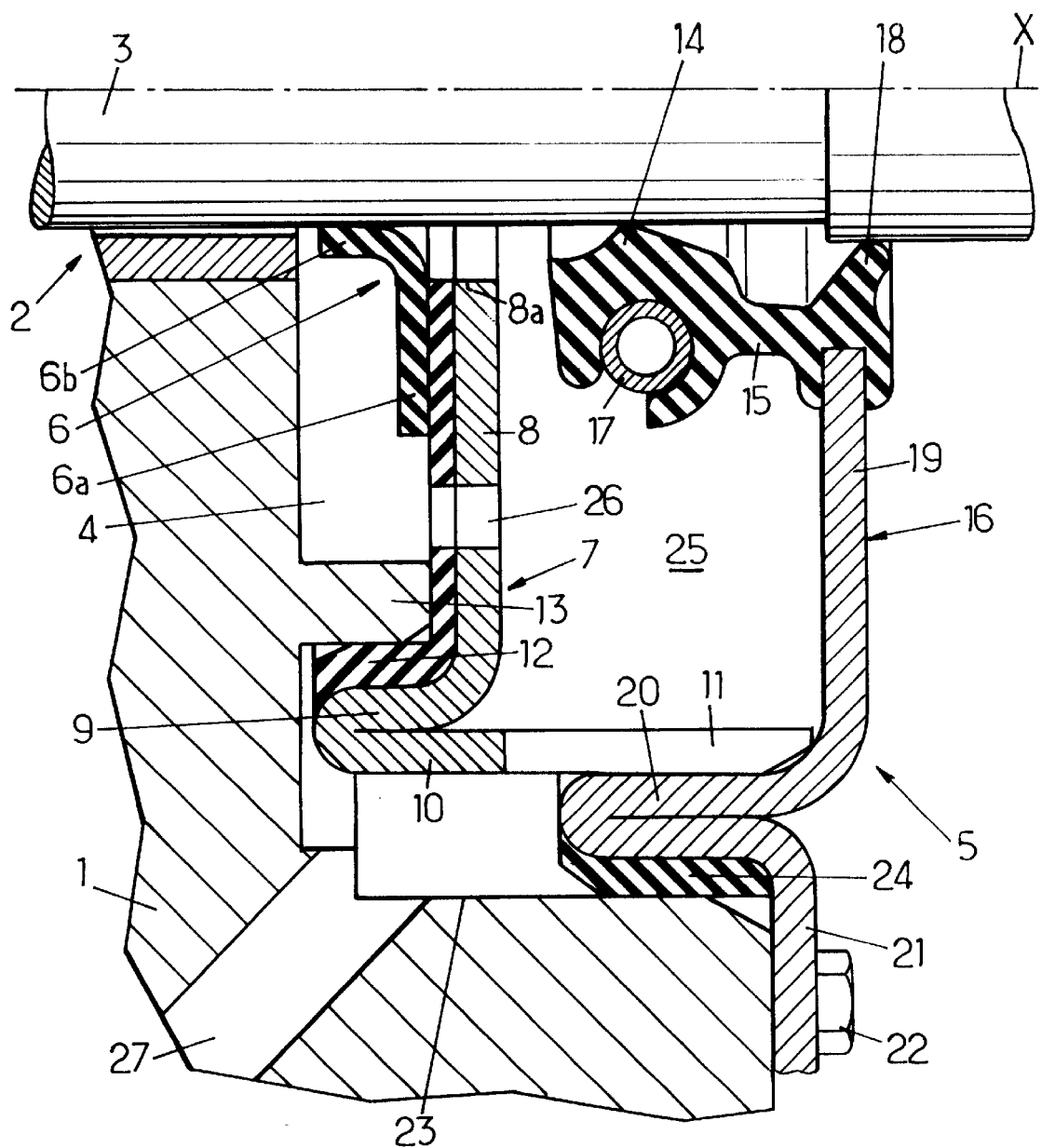
FIG. 1 is a view in axial section of a first embodiment of a sealing device as proposed by the invention.

FIG. 1 illustrates a part of a housing 1 on a level with a bearing 2, through which is inserted a shaft 3 which rotates about a longitudinal axis X.

The housing 1, which may form part of a hydraulic torque converter for an automatic gearbox on a motor vehicle, for example, has an interior volume 4 filled with pressurized oil.

Under all circumstances, the pressure of the oil contained in the interior volume 4 is in excess of 5 bar and generally ranges between 10 and 20 bar whilst the rotation speed of the shaft 3 about the axis X may reach values in excess of 5000 rpm, commonly up to 8000 rpm.

In order to ensure that the housing 1 is tightly sealed, each bearing 2 is provided with a gasket 5, which primarily comprises an inner sealing lip 6 describing a symmetrical shape in revolution about the axis X. This lip 6 is supported by a rigid, metal frame 7, also symmetrical in revolution about the axis X.

In the specific example illustrated in FIG. 1, the frame 7 has a wall 8, which extends radially from an internal edge 8a adjacent to the shaft 3 out towards the exterior as far as an axial fold 9. This fold 9 extends towards the interior of the housing 1 and is in turn extended at 180° towards the exterior of the housing 1 by means of an axial wall 10, in which axial slits 11 or orifices are arranged, the purpose of which will be explained below.

The face of the radial wall 8 directed towards the interior of the housing 1 and the face of the axial fold 9 directed radially towards the interior are covered with a layer of elastomer 12, which is bonded to the frame 7.

In addition, the axial fold 9 is mounted in a force-fit on an axial annular wall 13 forming part of the housing 1, describing a cylindrical shape in rotation about the axis X. This annular wall 13 is in tight contact, radially and axially, with the layer of elastomer 12.

Furthermore, the inner sealing lip 6 advantageously has an L-shaped cross section, a radial arm 6a being bonded onto the elastomer layer 12 and an axial arm 6b extending towards the interior of the housing 1 and which is in sliding rotary contact with the shaft 3 so as to close off the interior volume 4 filled with pressurised oil.

The inner sealing lip 6 is made from a material designed to withstand both the pressure of the oil contained in the interior volume 4 and the rotation speed of the shaft 3.

To this end, the inner sealing lip 6 is preferably made from PTFE, advantageously filled with glass fibres and lubricating fillers such as graphite or $MoS_2$, in order to limit wear on both the lip 6 and on the shaft 3.

Furthermore, the gasket 5 also has, to the exterior of the lip 6, an outer annular sealing lip 14, the contour of which describes a revolution about the axis X and which is in sliding rotary contact with the shaft 3. This lip 14 preferably has grooves (not illustrated) on its face in contact with the air in order to generate a local pressure above atmospheric pressure.

Advantageously, the outer sealing lip 14 is formed at the free end of an annular skirt 15 made from elastomer (rubber) extending substantially parallel with the axis X starting from a rigid metal frame 16.

By preference, the free end of the skirt 15, which forms the sealing lip 14, is reinforced by a torus-shaped helical spring 17.

Advantageously, the elastomer skirt 15 forms an anti-dust annular sealing lip 18 on a level with the frame 16.

In the embodiment illustrated in FIG. 1, the metal frame 16, the shape of which describes a rotation about the axis X, has a wall 19 extending radially out from the elastomer skirt 15 towards the exterior as far as an axial fold 20 directed towards the interior of the housing 1, this axial fold 20 being radially extended towards the exterior by a collar 21 joined to the housing 1 by screws 22 or other fixing means.

The axial fold 20 of the frame 6 fits into a cylindrical cavity 23 of the housing 1, which is centred on the axis X. In order to produce a tight seal between the fold 20 and the internal wall of the cavity 23, the face of the fold 20 disposed radially to the exterior is covered with a layer of elastomer 24 which is clamped between the fold 20 and the internal wall of the cavity 23.

Furthermore, the fold 20 is mounted in a force-fit on the axial wall 10 of the frame 7 without totally covering over the slits 11 in said wall 10.

An oil collecting chamber 25 is axially delimited between the inner sealing lip 6 and the frame 7 on the one hand and the outer sealing lip 14 and the frame 16 on the other.

This collecting chamber catches the oil from:
- slight leakages which might occur on a level with the inner sealing lip 6 on the one hand,
- and a calibrated nozzle 26 on the other, which allows a predetermined flow of oil, generally between 7 and 100 l/h, to be injected into the collecting chamber 25.

The calibrated nozzle 26 is preferably arranged so that the oil jet discharged from this nozzle does not come into direct contact with the sealing lip 14, which avoids disrupting operation of this sealing lip.

Due to the presence of oil in the collecting chamber 25, the sealing lip 14 is kept permanently lubricated, which guarantees that it will fulfil its function.

Furthermore, in order to ensure that pressure of the oil in the collecting chamber 25 always remains at a low level, i.e. under all circumstances below 1 bar and preferably less than 0.5 bar, the slits 11 of the frame 7 provide a discharge passage for oil, communicating with a duct 27 provided in the housing 1 and leading to an oil reservoir.

The duct 27 is directed downwards so that the oil will return to its reservoir by force of gravity.

Figure 2:
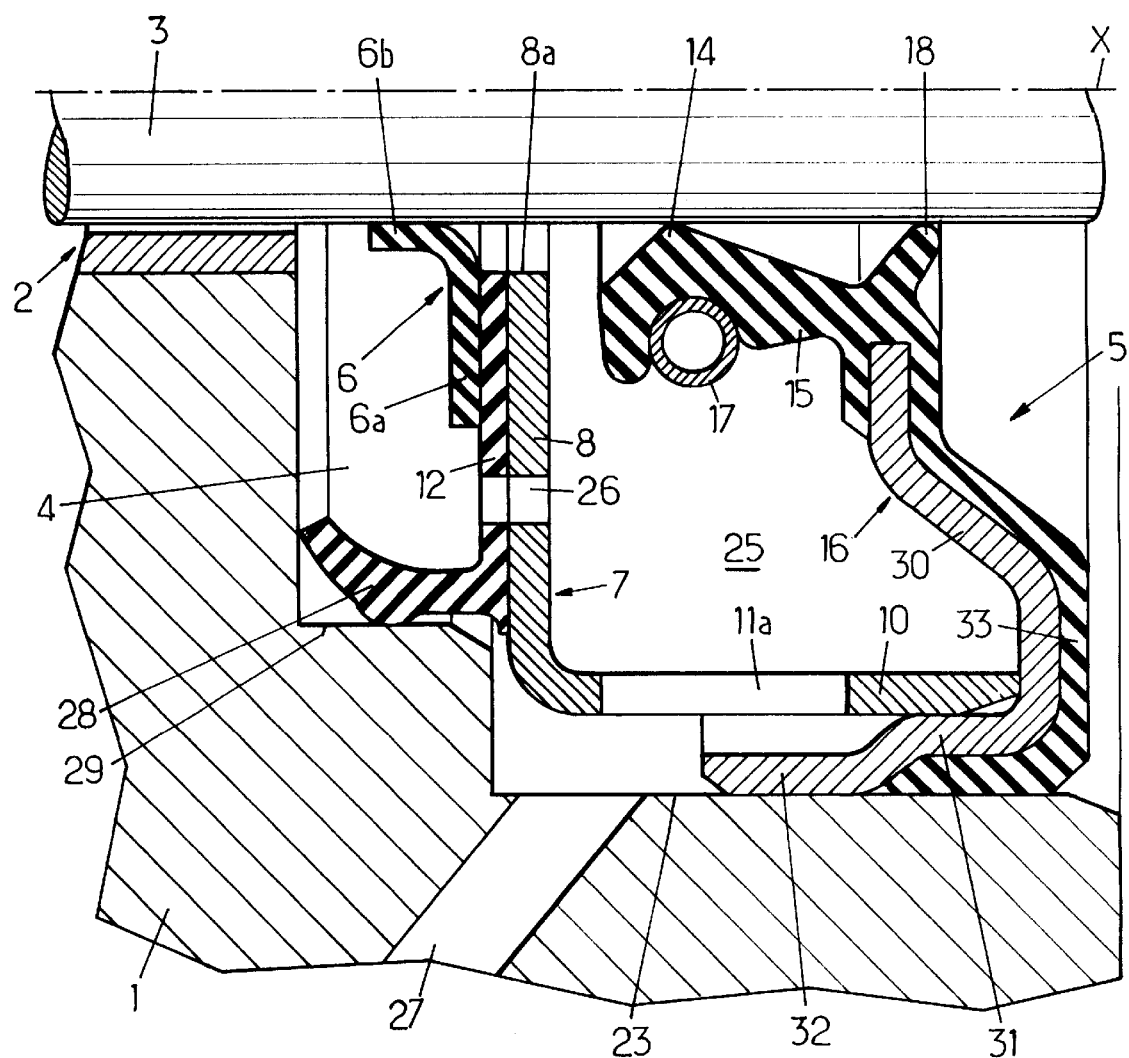

The second embodiment of the invention, which is illustrated in FIG. 2, is similar to the first embodiment. It will therefore not be described in detail and only the features which differ from the first embodiment will be explained below.

In this second embodiment, the metal frame 7 does not have a fold 9 but only the radial 8 and axial 10 walls, which means that the frame 7 has a substantially L-shaped cross-section.

Furthermore, the axial wall 10 of the frame 7 does not have a slit 11 but only orifices 11a.

In addition, the elastomer layer 12 bonded to the internal face of the radial wall 8 is axially extended towards the interior of the housing 1 by means of a sealing lip 28, which is applied in a tight contact against the internal wall of a cylindrical cavity 29 of the housing 1 under the effect of the pressure prevailing in the interior volume 4.

The frame 16 is also of a different shape in the second embodiment, since this frame comprises:
- a first wall 30 which extends radially towards the exterior and which is curved in shape, extending at a biassed angle towards the exterior of the housing 1,
- and a second wall 31 axially extending the wall 30 towards the interior of the housing 1, this wall 31 forming an enlarged collet 32, which is mounted by a force-fit (metal on metal) in the cylindrical cavity 23 of the housing 1, which is sufficient to fix the gasket 5 on the housing 1.

Furthermore, the elastomer skirt 15 is extended by means of a layer of elastomer 33, which is bonded onto the external faces of the walls 30 and 31 but does not cover the collet 32. The part of the elastomer layer 33 covering the wall 31 is radially clamped against the internal wall of the cylindrical cavity 23 so as to form a tight seal.

The third embodiment of the invention, which is illustrated in FIG. 3, is also similar to the first embodiment but differs by virtue of the following features:
- towards the inside, the fold 9 of the metal frame 7 delimits an empty space 9a which communicates with the duct 27 via one or more axial orifices 11b,
- the axial wall 10 of the frame 7 is radially clamped against the internal wall of the cylindrical cavity 23,
- the elastomer layer 12 of the frame 7 forms a sealing lip 12a, which bears axially against the base of the cylindrical cavity 23,
- the frame 16 has, between its radial wall 19 and its collar 21, an annular indentation 34 extending axially towards the frame 7 and which has punched bosses 35 provided locally which come into contact with the radial wall 8 of the frame 7 at positions located radially to the exterior the calibrated nozzle 26, these bosses 35 defining oil passages 36 through which the oil contained in the collecting chamber 25 can flow towards the empty space 9a mentioned above, in the direction of arrow 37,
- the elastomer layer 24 of the frame 16 covers the radially outermost face of the indentation 34 and a part of the internal face of the collar 21, this elastomer layer being inserted radially between the indentation 34 and the axial wall 10 of the frame 7 and said elastomer layer having a sealing lip 24a which is axially compressed between the collar 21 and a shoulder 38, formed on the open end of the cylindrical cavity 23.

I claim:

1. A gasket designed to be inserted between:
   a housing with an interior volume filled with liquid lubricant under pressure,
   and a shaft projecting out from said housing and rotating at a certain rotation speed about a longitudinal axis,
   said gasket comprising a first annular sealing lip which is designed to be joined to the housing and placed in sliding rotary contact with the shaft, the first sealing lip being designed to withstand a first lubricant threshold pressure below 1 bar and to permit shaft rotation speeds in excess if 5000 rpm,
   wherein said gasket also has a second annular sealing lip which is also designed to be joined to the housing and to be in sliding contact with the shaft, the second sealing lip being designed to permit shaft rotation speeds in excess of 5000 rpm and to withstand a second threshold pressure, in excess of 5 bar, prevailing in the interior volume of the housing, this second sealing lip being designed so that it can be inserted between the interior volume of the housing and the first sealing lip,
   wherein the second sealing lip delimits, in conjunction with the first sealing lip, a lubricant collecting chamber provided with a discharge passage for the lubricant,
   wherein the gasket also has a calibrated nozzle bypassing the second sealing lip so as to provide direct communication between the interior volume of the housing and the collecting chamber, said calibrated nozzle being formed in a portion of the gasket which supports the second sealing lip,
   and wherein the calibrated nozzle, the second sealing lip and the lubricant discharge passage are so dimensioned that a lubricant pressure prevailing in the collecting chamber is at most equal to said first threshold pressure when the lubricant contained in the interior volume of the housing is at a pressure at most equal to the second threshold pressure.

2. A gasket as claimed in claim 1, wherein the second sealing lip is made from PTFE.

3. A gasket as claimed in claim 1, wherein the first sealing lip is made from elastomer.

4. A gasket as claimed in claim 1, additionally having a third anti-dust sealing lip which is joined to the housing and which is in sliding rotary contact with the shaft, this third sealing lip being arranged opposite the collecting chamber relative to the first sealing lip in order to protect said first sealing lip.

5. A gasket as claimed in claim 1, wherein the calibrated nozzle and the second sealing lip are so dimensioned that lubricant flows at a rate ranging between 7 and 100 l/h from the interior volume of the housing to the collecting chamber if a pressure ranging between 10 and 20 bar prevails in said interior volume.

6. A gasket as claimed in claim 1, wherein the second threshold pressure is between 10 and 20 bar.

7. A gasket as claimed in claim 1, wherein the first and second sealing lips are joined respectively to first and second rigid frame which are fixed one to the other in a clamped fit, at least one of these frames having at least one recess which forms the discharge passage for the lubricant.

8. A device comprising:
   a housing with an interior volume filled with liquid lubricant under pressure,
   a shaft projecting out from said housing and rotating at a certain rotation speed about a longitudinal axis, and a gasket as claimed in claim 1, inserted between the shaft and the housing, the first and second sealing lips of the gasket being joined to the housing and in sliding rotary contact with the shaft, the second sealing lip being disposed axially between the interior volume of the housing and the first sealing lip and the calibrated nozzle providing direct communication between the interior volume of the housing and the collecting chamber.

9. A sealing device as claimed in claim 8, wherein the second sealing lip has an L-shaped cross section, with a first arm joined to a rigid frame substantially perpendicular to the longitudinal axis of the shaft and having a second arm which extends towards the interior volume of the housing substantially parallel with the longitudinal axis of the shaft.

10. A sealing device as claimed in claim 8, wherein the pressure of the lubricant in the interior volume of the housing is between 10 and 20 bar and the second sealing lip is designed to withstand this pressure.

11. A sealing device as claimed in claim 8, wherein the first and second sealing lips are joined respectively to first and second rigid frames which are fixed one to the other in a clamp fit, the second frame having at least one recess which forms the lubricant discharge passage, the first and second frames each having a cylindrical wall covered with elastomer which co-operates to provide a fitting on the housing to close off respectively the interior volume of the housing and the collecting chamber, and the first frame also has an external extension which is joined directly to the housing.

12. A sealing device as claimed in claim 8, wherein the first and second sealing lips are joined respectively to first and second rigid frames which are fixed one to the other in a clamp fit, the second frame having at least one recess which forms the lubricant discharge passage, the first frame having a cylindrical wall covered with elastomer which co-operates to form a fitting on the housing to provide a sealed closure of the collecting chamber, this cylindrical wall being extended by a rigid, enlarged cylindrical collet which is in direct contact with the housing and which co-operates with said housing by means of a force-fit, the second frame being joined to an additional sealing lip which co-operates with the housing to seal off the interior volume of said housing.

13. A sealing device as claimed in claim 8, wherein the first and second sealing lips are joined respectively to first and second rigid frames, which are fixed one to the other by a clamp fit with a layer of elastomer seal inserted between them, the second frame having at least one recess which forms the lubricant discharge passage, the first frame being joined to a first additional elastomer sealing lip which co-operates with the housing to seal off the collecting chamber, the second frame being joined to a second additional sealing lip which co-operates with the housing to seal off the interior volume of said housing, the first frame being joined directly to the housing and being axially supported against the second frame at local points.

\* \* \* \* \*